United States Patent
Gardenier et al.

(10) Patent No.: US 6,490,740 B1
(45) Date of Patent: Dec. 10, 2002

(54) MOTORIZED CONTROL OF WATER DELIVERY THROUGH PORTS OF TUB, SPA OR SHOWER

(75) Inventors: W. John Gardenier, Albany, NY (US); John V. Maiuccoro, Albany, NY (US)

(73) Assignee: Saratoga Spa & Bath Co., Inc., Latham, NY (US)

(*) Notice: Subject to any disclaimer, the term of this patent is extended or adjusted under 35 U.S.C. 154(b) by 0 days.

(21) Appl. No.: 09/497,331

(22) Filed: Feb. 3, 2000

Related U.S. Application Data

(63) Continuation-in-part of application No. 09/339,714, filed on Jun. 24, 1999, now Pat. No. 6,185,757.

(51) Int. Cl.[7] .................................................. A47K 3/00
(52) U.S. Cl. ............................ 4/541.1; 4/541.2; 4/601
(58) Field of Search ........................... 4/541.1, 541.3, 4/541.6, 569, 568, 601, 567, 541.2, 584; 137/625.11, 625.16

(56) References Cited

U.S. PATENT DOCUMENTS

| | | | |
|---|---|---|---|
| 932,284 A | * 8/1909 | Jones | 137/207.5 |
| 1,154,177 A | 9/1915 | Detwiler | |
| 2,641,280 A | 6/1953 | Fleischhauer | |
| 3,096,788 A | 7/1963 | Talbot et al. | 137/625.11 |
| 3,692,041 A | 9/1972 | Bondi | 137/238 |
| 3,874,413 A | 4/1975 | Valdez | 137/625.47 |
| 3,941,154 A | 3/1976 | Bishop | 137/624 |
| 4,177,927 A | 12/1979 | Simmons | 239/101 |
| 4,371,003 A | 2/1983 | Goguen | 137/625.46 |
| 4,553,566 A | * 11/1985 | Barclay et al. | 137/625.11 |
| 4,800,046 A | 1/1989 | Malek et al. | 261/50.3 |
| 4,918,768 A | 4/1990 | DeSousa et al. | 4/542 |
| 4,972,876 A | 11/1990 | Kabata et al. | 137/625.16 |
| 5,343,893 A | 9/1994 | Hogan et al. | 137/624.13 |
| 5,474,102 A | 12/1995 | Lopez | 137/271 |
| 5,517,800 A | * 5/1996 | Brenner | 53/473 |
| 5,754,989 A | 5/1998 | Ludlow | 4/541.6 |
| RE35,866 E | * 8/1998 | Simmons | 239/17 |
| 5,809,648 A | 9/1998 | Kurth et al. | 29/890.142 |
| 5,820,133 A | 10/1998 | Altshuler | 277/630 |
| 5,848,611 A | 12/1998 | Stanevich | 137/625.47 |
| 5,862,543 A | 1/1999 | Reynoso et al. | 4/541.6 |

* cited by examiner

*Primary Examiner*—Gregory Huson
*Assistant Examiner*—Huyen Le
(74) *Attorney, Agent, or Firm*—Heslin Rothenberg Farley & Mesiti P.C.; Nicholas Mesiti, Esq.; Victor A. Cardona, Esq.

(57) ABSTRACT

A system for motorized control, by a user, of water delivery to an interior of a tub, spa or shower includes a plurality of ports and a flow control device. The device includes a motor, a controller, a first pipe, and a second pipe. The first pipe includes a plurality of inlets. The second pipe is movable relative to the first pipe, and the second pipe includes a plurality of outlets in fluid communication with the plurality of ports. The motor is connected with the first pipe or the second pipe and the controller is coupled with the motor and programmed by a user. The controller is programmable to allow water flow from one or more of the ports in a preselected flow patten at preselected intervals of time. Moving of the first pipe or the second pipe by the motor controlled by the controller serves to cause communication of an inlet of the plurality of inlets with a first outlet of the plurality of outlets. The first outlet is in fluid communication with a first port of the plurality of ports. The communication of the inlet with the first outlet serves to allow flow of water from a water source to the inlet to the first outlet to the first port to the interior of the tub, spa or shower. The moving of the first pipe or the second pipe also serves to block a second outlet of the plurality of outlets with a solid portion of the first pipe. The second outlet is in fluid communication with a second port of the plurality of ports. The blocking of the second outlet with the solid portion serves to prevent flow of water from the water source to the second port to the interior of the tub, spa or shower.

20 Claims, 12 Drawing Sheets

FIG. 7
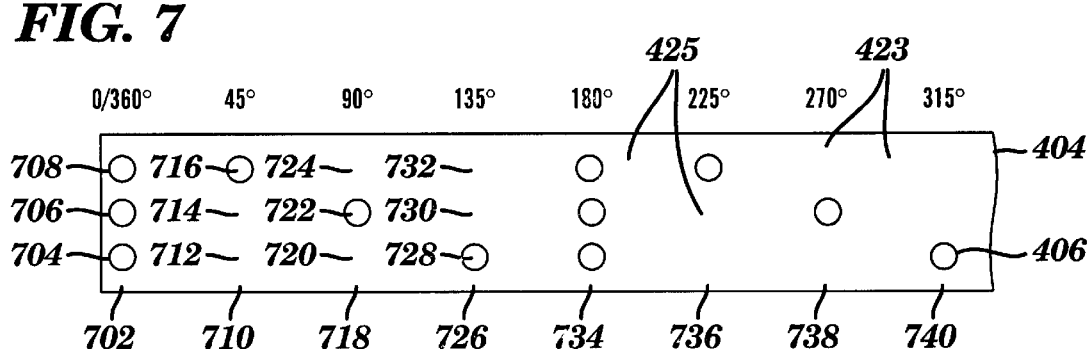
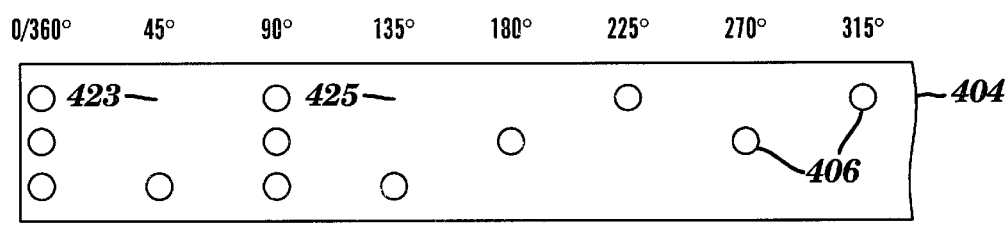
FIG. 19
FIG. 16
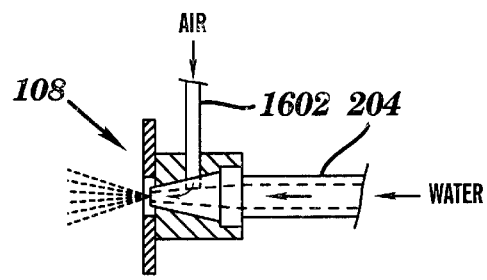
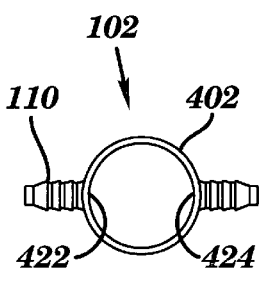
FIG. 6
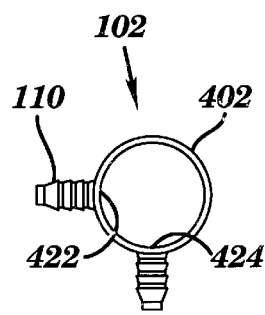
FIG. 17
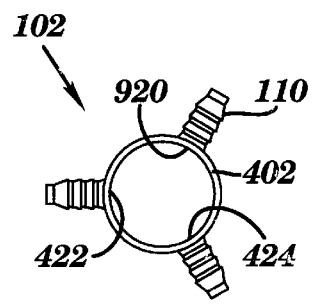
FIG. 20

MOTORIZED CONTROL OF WATER DELIVERY THROUGH PORTS OF TUB, SPA OR SHOWER

CROSS REFERENCE TO RELATED APPLICATION

This application is a Continuation-In-Part application of co-pending application Ser. No. 09/339,714, filed Jun. 24, 1999, also entitled MANUAL CONTROL OF WATER DELIVERY THROUGH PORTS OF TUB, SPA OR SHOWER.

TECHNICAL FIELD

This invention relates, generally, to water flow into tubs, spas or showers and, more particularly, to motorized control of water delivery through ports in tubs, spas or showers.

BACKGROUND ART

Tubs, spas or showers generally have a number of fluid flow ports or nozzles. Each flow port usually transmits or jets water or a water-air froth into the tub, spa or shower. Enhanced treatment or enjoyment for a user typically results from increased control over the flow of fluid to the tub, spa or shower.

One design employs a multi-ported valve having a handle to allow a user to rotate an inner cylindrical member relative to an outer cylindrical casing for selective alignment of ports of the inner cylindrical member and ports of the outer cylindrical member, for selective flow among a water supply and recirculating system, a spa, and a swimming pool. For instance, the user can manually rotate the handle to align a first port for flow of water to the spa and a second port for flow of water from the spa, and then the user can further manually rotate the handle to stop the flow of water to move from the spa and instead align the first port for flow of water to the swimming pool and align the second port for flow of water from the swimming pool. These first and second ports are the only ports for water flow between the valve and the spa for between the valve and the swimming pool. For example, the manual rotation of the handle by the user does not allow selection among individual ones, sets, or subsets of ports for water flow into the spa. Such a design is disclosed in U.S. Pat. No. 3,874,413 issued to Valdez.

Another configuration includes an air valve for spas and baths. Air is drawn from the air valve to a jet by a venturi effect created by coupling of a water pump to the jet. A knob is manipulated by a user to selectively cause full, partial, or no air flow from the air valve to the jet. The air valve includes a housing having a port and a slot, and a barrel having a port. A user can turn the knob connected with the barrel, to cause selective flow or blockage of air, by selectively aligning the port of the barrel with the slot or port of the housing, or by selectively blocking the port of the barrel by aligning neither the slot nor port of the housing with the port of the barrel. In this configuration, only one jet delivers water from the pump to the spa or bath. The manual turning of the knob by the user does not allow selection among individual ones, sets, or subsets of ports for water flow into the spa or bath. The manipulation of the knob simply selects the quantity of air content in the flow through the jet. Such a configuration is disclosed in U.S. Pat. No. 4,918,768 issued to DeSousa et al.

Thus, a need exists for increasing selectability and/or controllability of water delivery to a tub, spa or shower in which a flow control device comprises a controller and motor with the controller being programmed by a user. A need also exists for improving controllability, selectability, ease, accuracy, repeatability, effectiveness, efficiency and/or performance in use of individual ones, sets, or subsets of ports in a tub, spa or shower through which water is delivered by the programming of a controller of a flow control device by a user.

SUMMARY OF THE INVENTION

Pursuant to the present invention, shortcomings of the existing art are overcome and additional advantages are provided through the provision of motorized control of water delivery to ports of a tub, spa or shower.

In one aspect of the invention, a system for user control, of water delivery to an interior of a tub, spa or shower includes a plurality of ports and a flow control device. The plurality of ports are located on a surface of the tub, spa or shower, and are configured to transmit water to the interior of the tub, spa, or shower. The flow control device is in communication with a water source. The device includes a motor, a controller, a first pipe, and a second pipe. The first pipe includes a plurality of inlets. The second pipe is movable relative to the first pipe, and the second pipe includes a plurality of outlets in fluid communication with the plurality of ports. The motor is connected with the first pipe or the second pipe and the controller is coupled with the motor and programmed by a user. Moving of the first pipe or the second pipe by the motor controlled by said controller to a position of the plurality of positions serves to cause communication of an inlet of the plurality of inlets with a first outlet of the plurality of outlets. The first outlet is in fluid communication with a first port of the plurality of ports. The communication of the inlet with the first outlet serves to allow flow of water from the water source to the inlet to the first outlet to the first port to the interior of the tub, spa or shower. The moving of the first pipe or the second pipe to the position also serves to block a second outlet of the plurality of outlets with a solid portion of the first pipe. The second outlet is in fluid communication with a second port of the plurality of ports. The blocking of the second outlet with the solid portion serves to prevent flow of water from the water source to the second port to the interior of the tub, spa or shower.

The position can comprise a first position of the plurality of positions. The inlet can comprise a first inlet of the plurality of inlets. Moving of the first pipe or the second pipe by the motor controlled by the controller to a second position of the plurality positions can serve to cause communication of a second inlet of the plurality of inlets with the second outlet. The communication of the second inlet with the second outlet can serve to allow flow of water from the water source to the second inlet to the second outlet to the second port to the interior of the tub, spa or shower.

The moving of the first pipe or the second pipe to the second position can serve to cause communication of a third inlet of the plurality of inlets with the first outlet. The communication of the third inlet with the first outlet can serve to allow flow of water from the water source to the third inlet to the first outlet to the first port to the interior of tub, spa or shower.

The moving of the first pipe or second pipe to the second position can serve to block the first outlet with a second solid portion of the first pipe. The blocking of the first outlet with the second solid portion can serve to prevent flow of water from the water source to the first port to the interior of the tub, spa or shower.

The first inlet and the solid portion can be located in a first circumferential portion of the plurality of circumferential portions. The second inlet can be located in a second circumferential portion of the plurality of circumferential portions. The second circumferential portion can be different from the first circumferential portion.

The first pipe can comprise a plurality of circumferential portions. The first inlet can be located in a first circumferential portion of the plurality of circumferential portions. The second inlet can be located in a second circumferential portion of the plurality of circumferential portions. The solid portion can be located in a third circumferential portion of the plurality of circumferential portions. The third circumferential portion can be located between the first and second circumferential portions.

The moving of the first pipe or the second pipe by the motor controlled by the controller to the second position can serve to cause second communication of the first inlet with the first outlet. The second communication of the first inlet with the first outlet can serve to allow flow of water from the water source to the first inlet to the first outlet to the first port to the interior of the tub, spa or shower. The second communication of the first inlet with the first outlet can serve to allow a decreased rate of flow of water from the water source to the first inlet to the first outlet to the first port to the interior of the tub, spa or shower.

The moving of the first pipe or the second pipe to the position can serve to cause communication of a second inlet of the plurality of inlets with a third outlet of the plurality of outlets. The third outlet can be in fluid communication with a third port of the plurality of ports. The communication of the second inlet with the third outlet can serve to allow flow of water from the water source to the second inlet to the third outlet to the third port to the interior of the tub, spa or shower. The moving of the first pipe or the second pipe to the position can serve to block a fourth outlet of the plurality of outlets with a second solid portion of the first pipe. The fourth outlet can be in fluid communication with a fourth port of the plurality of ports. The blocking of the fourth outlet with the second solid portion can serve to prevent flow of water from the water source to the fourth port to the interior of the tub, spa or shower.

Moving of the first pipe or the second pipe by the motor controlled by the controller to a second position of the plurality of positions can serve to cause communication of a third inlet of the plurality of inlets with the second outlet and cause communication of a fourth inlet of the plurality of inlets with the fourth outlet. The communication of the third inlet with the second outlet can serve to allow flow of water from the water source to the third inlet to the second outlet to the second port to the interior of the tub, spa or shower. The communication of the fourth inlet with the fourth outlet can serve to allow flow of water from the water source to the fourth inlet to the fourth outlet to the fourth port to the interior of the tub, spa or shower.

The controller may be programmable to allow water from the water source to flow from one or more of the ports in a preselected flow pattern at preselected intervals of time.

The first port and the third port can be located on different parts of the surface about an intended location for a user in the tub, spa or shower.

An air supply conduit can be in fluid communication with the first port. The flow of water through the inlet to the first port to the interior of the tub, spa or shower can serve to draw air from the air supply conduit for transmission, with the flow of water, through the first port to the interior of the tub, spa or shower.

The device can include a relief valve configured to provide pressure relief approximately at a particular level of fluid pressure in the device. The relief valve can be in fluid communication with an additional port located on the surface of the tub, spa or shower.

A second plurality of ports can be located on the surface of the tub, spa or shower. The second plurality of ports can be configured to transmit water to the interior of the tub, spa or shower. A second flow control device can be in fluid communication with the water source. The second device can include a second motor, a third pipe, and a fourth pipe. The third pipe can include a second plurality of inlets. The fourth pipe can be movable relative to the third pipe, and the fourth pipe can include a second plurality of outlets in fluid communication with the second plurality of ports. The second motor can be connected with the third pipe or the fourth pipe and the controller can be coupled with the second motor. Moving of the third pipe or the fourth pipe by the second motor controlled by the controller to a second position of the second plurality of positions can serve to cause communication of a second inlet of the second plurality of inlets with a third outlet of the second plurality of outlets. The third outlet can be in fluid communication with a third port of the second plurality of ports. The communication of the second inlet with the third outlet can serve to allow flow of water from the water source to the second inlet to the third outlet to the third port to the interior of the tub, spa or shower. The moving of the third pipe or the fourth pipe to the second position can also serve to block a fourth outlet of the second plurality of outlets with a second solid portion of the third pipe. The fourth outlet can be in fluid communication with a fourth port of the second plurality of ports. The blocking of the fourth outlet with the second solid portion can serve to prevent flow of water from the water source to the fourth port to the interior of tub, spa or shower.

In another aspect, a system for user control of water delivery to an interior of a tub, spa or shower includes a plurality of ports and a flow control device. The plurality of ports are located on a surface of the tub, spa or shower, and are configured to transmit water to the interior of the tub, spa or shower. The flow control device is in communication with a water source. The device includes a motor, a controller, a first pipe, and a second pipe. The first pipe includes a plurality of inlets. The second pipe is movable relative to the first pipe, and the second pipe includes a plurality of outlets in fluid communication with the plurality of ports. The motor is connected with the first pipe or the second pipe and the controller is coupled with the motor and programmed by a user. Moving of the first pipe or the second pipe by the motor controlled by the controller to a position of the plurality of positions serves to cause communication of an inlet set of the plurality of inlets with a first outlet set of the plurality of outlets. The first outlet set is in fluid communication with a first port set of the plurality of ports. The communication of the inlet set with the first outlet set serves to allow flow of water from the water source to the inlet set to the first outlet set to the first port set to the interior of the tub, spa or shower. The moving of the first pipe or the second pipe to the position also serves to block at least one outlet of a second outlet set of the plurality of outlets with a solid portion of the first pipe. The at least one outlet is in fluid communication with at least one port of a second port set of the plurality of ports. The blocking of the at least one outlet with the solid portion serves to prevent flow of water from the water source to the at least one port to the interior of the tub, spa or shower.

The position can comprise a first position of the plurality of positions. The inlet set can comprise a first inlet set of the plurality of inlets. Moving of the first pipe or the second pipe by the motor controlled by the controller to a second position of the plurality of positions can serve to cause communication of a second inlet set of the plurality of inlets with the second outlet set. The second outlet set can be in fluid communication with the second port set. The communication of the second inlet set with the second outlet set can serve to allow flow of water from the water source to the second inlet set to the second outlet set to the second port set to the interior of the tub, spa or shower.

The first pipe can comprise a plurality of circumferential portions. The first inlet set and the solid portion can be located in a first circumferential portion of the plurality of circumferential portions. The second inlet set can be located in a second circumferential portion of the plurality of circumferential portions. The second circumferential portion can be different from the first circumferential portion.

The first outlet set can comprise a subset of the second outlet set. The first port set can comprise a subset of the second port set.

Thus, the present invention advantageously provides a system that improves controllability, selectability, accuracy, effectiveness, efficiency and/or performance of a flow control device for water communication with ports of a tub, spa or shower through the programming of a controller by a user. The invention also increases selectability and/or controllability of water delivery to a tub, spa or shower in which a controller of a flow control device is programmed by a user. In addition, the invention improves controllability, selectability, ease, accuracy, repeatability, effectiveness, efficiency and/or performance in use of individual ones, sets, or subsets of ports in a tub, spa or shower through which water is delivered by the programming of a controller of a flow control device by a user.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be readily understood from the following detailed description of preferred embodiments taken in conjunction with the accompanying drawings in which:

FIG. 6 is a partial, cutaway, sectional, top view of the outer pipe of the flow control device of FIG. 4;

FIG. 7 is a mapped representation of exemplary sets of inlets located in circumferential portions of an inner pipe of the flow control device of FIG. 4;

FIG. 16 is a partial, sectional, cutaway view of one example of a water tube coupled with a port of the tub, spa or shower, illustrating flow of water through the tube serving to draw air from an air supply conduit in fluid communication with the tube;

FIG. 17 is a partial, cutaway, sectional, top view of another example of an outer pipe of a flow control device, illustrating sets of outlets of the outer pipe generally directed in orthogonal directions;

FIG. 19 is a mapped representation of exemplary sets of inlets located in circumferential portions of an inner pipe of the flow control device of FIG. 17;

FIG. 20 is a partial, cutaway, sectional, top view of yet another example of an outer pipe of a flow control device, illustrating outlets of the outer pipe generally directed in directions having an obtuse angle therebetween;

BEST MODE FOR CARRYING OUT THE INVENTION

In accordance with the principles of the present invention, a user may program a controller of a flow control device to select and/or control water delivery through particular ones, sets, or subsets of ports in a tub, spa or shower.

Figure 1:
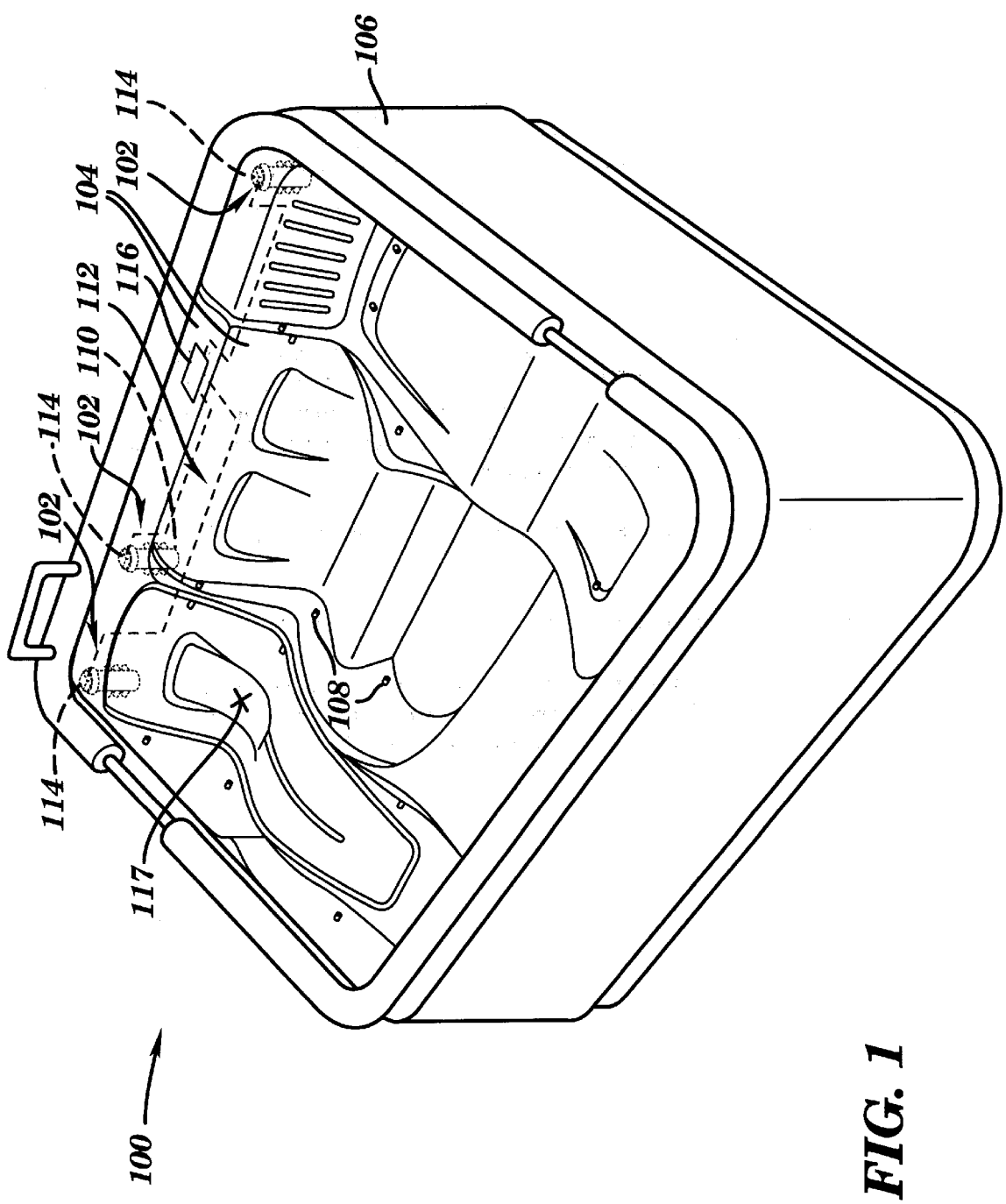
FIG. 1 is a partial, perspective view of one example of a system including exemplary flow control devices and ports located on a surface of one example of a tub, illustrating in phantom exemplary orientations for outlets of the flow control devices, and also illustrating in phantom motors of the flow control devices.
Figure 2:
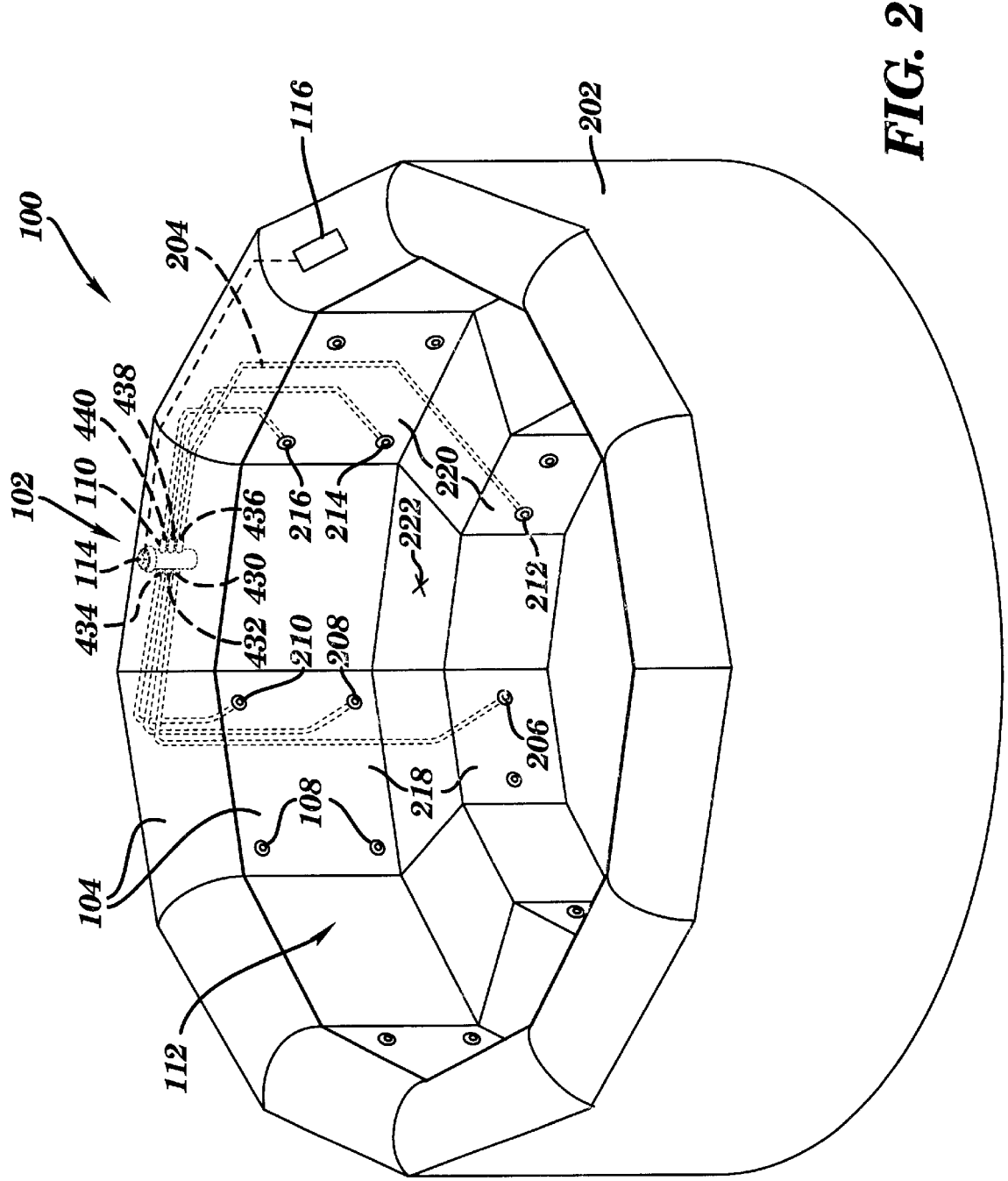
FIG. 2 is a partial, perspective view of an illustrative system including one example of a flow control device and ports located on a surface of one example of a spa, illustrating in phantom one example of fluid communication on a one-to-one basis from outlets of the flow control device to a plurality of the ports, and also illustrating in phantom a motor of the flow control device.
Figure 3:
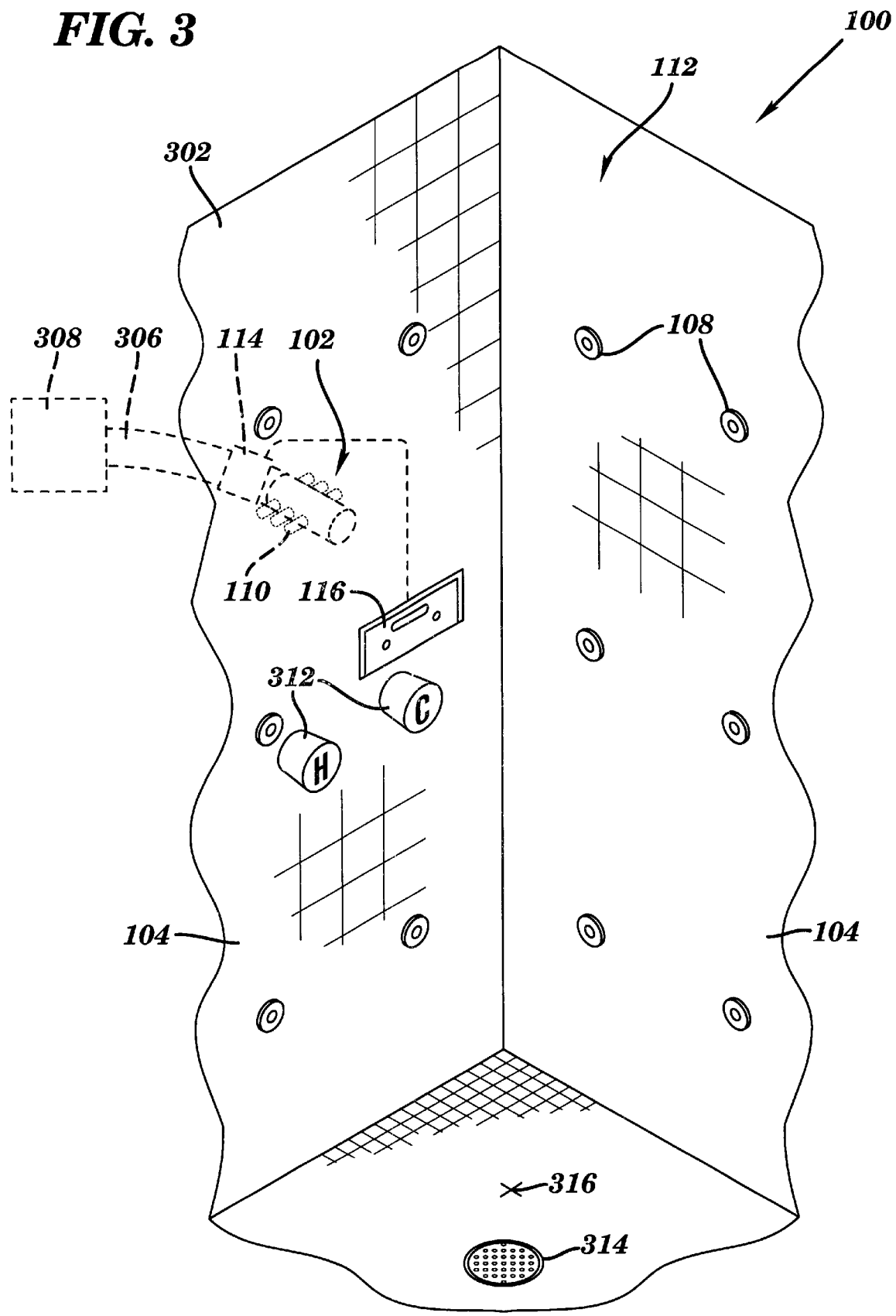
FIG. 3 is a partial, perspective, cutaway view of an exemplary system including one example of a flow control device and ports located on a surface of one example of a shower, illustrating in phantom an exemplary orientation for outlets of the flow control device, further illustrating in phantom one example of a water source in communication with the flow control device and also illustrating in phantom a motor of the flow control device.

Referring to FIGS. 1–3, system 100 may include one or more instances of flow control device 102 located on or beneath surface 104 of tub 106 (FIG. 1), spa 202 (FIG. 2), or shower 302 (FIG. 3). The tub, spa or shower may include interior 112. The interior may receive, hold, circulate and/or drain water and/or water-air froth. The surface may include curves, contours and/or planes. For example, the surface may be configured to provide comfortable, therapeutic and/or enjoyable seating, standing, reclining, positioning and/or fluid flow for one or more users 304 (FIG. 3) who may be located in the interior of the tub, spa or shower, as described herein.

Referring further to FIGS. 1–3, system 100 may include a plurality of ports 108. The ports may be located on surface 104 of the tub, spa or shower. In addition, the ports may be configured to transmit water to interior 112. In one example, one or more of the ports may comprise a nozzle. The ports may be in fluid communication with a plurality of connectors 204 (FIG. 2). The connectors may provide fluid communication between the ports and a plurality of outlets 110 of flow control device 102. For instance, the connectors may comprise a number of tubes attached and/or fastened to the outlets and the ports. Water may be transmitted by the connectors from the outlets to the ports. In one example, a conductor 306 (FIG. 3) may transmit water to the flow control device, for transmission from the outlets through the connectors to the ports. The conductor may receive water from water source 308 (FIG. 3). For instance, the conductor may comprise a tube coupled with the water source. The water source may comprise a water pump attached and/or fastened to the conductor for transmitting pressurized water therethrough. In addition, the outlets may be configured to ease and/or facilitate fastening, coupling, unfastening, decoupling, re-fastening and/or re-coupling thereof with the conductors. For instance, referring to FIG. 1, sets of the outlets may be directed in generally orthogonal directions (e.g., generally away from the interior of the tub) when the flow control device is located at a corner of the tub, and sets of the outlets may be directed in generally opposite directions (e.g., generally in parallel with a local surface) when the flow control device is located between corners of the tub.

Again referring to FIGS. 1–3, flow control device 102 may include a controller 116 for controlling a motor 114 which may move a first pipe relative to a second pipe or alternatively may move the second pipe relative to the first pipe. Controller 116 or a display for controller 116 may be located on surface 104, while motor 114 may be located on or beneath surface 104. Programming controller 116 to control motor 114 may allow selection among ports 108 for water delivery to interior 112 of the tub, spa or shower. In addition, one or more knobs 312 may be located on surface 104 of the tub, spa or shower. For example, the user may manually turn the one or more knobs to adjust the temperature of the water delivered through the flow control device to the ports and the interior of the tub, spa or shower. For instance, an exit 314 may be located on the surface of the tub, spa or shower. The exit may allow water to be removed, drained, and/or expelled from the interior of the tub, spa or shower. The selection of the ports for conduction of the water may be controlled by the user programming controller 116 to control motor 114 of flow control device 102, as described herein.

Referring further to FIGS. 1–3, ports 108 may be cooperatively and/or strategically arranged on surface 104 of the tub, spa or shower. The ports may have water conducted (e.g., distributed) therethrough as individual ones and/or in groups, sets, or subsets. In one example, a particular port 108 may be in fluid communication with a certain outlet 110 on a one-to-one basis. In another example, a particular port 108 may be in fluid communication with multiple outlets 110 on a one-to-many basis. In yet another example, multiple ports 108 may be in fluid communication with a certain outlet 110 on a many-to-one basis. In a further example, multiple ports 108 may be in fluid communication with multiple outlets 110 on a many-to-many basis.

Again referring to FIGS. 1–3, ports 108 may be located, for instance, on different parts of surface 104 about an intended location for user 304 (FIG. 3). For instance, referring to FIG. 2, pairs of ports 108 may be located approximately about the chest, the lower back, and the ankles of user 304 intended to be located (e.g., seated) approximately at exemplary location 222 on the surface of spa 202. As another example, referring to FIG. 1, pairs of ports 108 may be located approximately about the neck, the hips, and the feet of user 304 intended to be located (e.g., reclined) approximately at exemplary location 116 on the surface of tub 106. For example, referring to FIG. 3, pairs of ports 108 may be located approximately about the head, the waist, and the calves of user 304 intended to be located (e.g., standing) approximately at exemplary location 316 on the surface of shower 302. With such a configuration, a single user by programming controller 116 to control motor 114 can select whether the flow from the flow control device will flow from the sets of nozzles about the head, or about the waist, or about the lower legs, or about all these locations. Thus, by programming the controller, the user selectively controls the flow to different parts of his or her body.

For explanatory purposes, an illustrative description of exemplary water flow through ports 108 to interior 112 as selected by programming of controller 116 of flow control device 102 by user 304, is presented with reference to FIGS. 1–3.

Referring to FIG. 1, the user at location 17 may program the controller to control the motor to turn the first pipe or the second pipe to a first position which causes flow of water from the ports to both feet of the user. The user may program the controller to control the motor to turn the first pipe or the second pipe to a second position which causes flow of water from the ports to both hips of the user. The user may program the controller to control the motor to turn the first pipe or the second pipe to a third position which causes flow of water from the ports to left and right sides of the neck of the user. The user may program the controller to control the motor to turn the first pipe or the second pipe to a fourth position which causes flow of water from the ports to left and right sides of the neck and both hips of the user. The user may program the controller to control the motor to turn the first pipe or the second pipe to a fifth position which causes flow of water from the ports to left and right sides of the neck and both feet of the user. The user may program the controller to control the motor to turn the first pipe or the second pipe to a sixth position with causes flow of water from the ports to left and right sides of the neck, both hips, and both feet of the user. The user may program the controller to control the motor to turn the first pipe or the second pipe to a seventh position with causes flow of water from the ports to both hips and both feet of the user. The user may program the controller to control the motor to turn the first pipe or the second pipe to an eighth position which causes flow of water from the ports to part of the neck, a hip, and a foot of the user, which may be on a same side of the user or on alternating sides of the user or otherwise distributed about the user, with a ninth position to which the user may program the controller to control the motor to turn the first pipe or the second pipe causing flow of water in a complementary pattern, for instance, to another part of the neck, the other hip, and the other foot of the user.

Programming of the controller may also allow the preselection of flow patterns among the positions of the first or the second pipe described above. For example, the controller might be programmed to cause water flow to alternate at specified intervals of time between the first and second positions described above causing water flow to alternate between a user's feet and hips. The user might program the controller to alternate between the first, second, and third positions of the first or second pipe causing water flow to alternate between a user's feet, hips, and neck. Alternatively, the controller might be programmed to cause water flow at specified intervals of time between one side of a user's neck and one foot or it may be programed to allow flow to alternate between one foot, one hip, and one side of a neck. Thus, the controller might allow a user to take advantage of all or some of the ports at timing preferable to him through programming the controller to move the first or second pipe among a plurality of positions. The number of flow patterns can be varied by either changing the position of the first or the second pipe, or the time or cycle which the first pipe rotates relative to the second pipe. Thus, by varying the cycle time, the number of flow patterns is virtually unlimited.

Referring to FIG. 2, the user at location 222 may program the controller to control the motor to turn the first pipe or the second pipe to a first position which causes flow of water from the ports to both Achilles tendons of the user. The user may program the controller to control the motor to turn the first pipe or the second pipe to a second position which causes flow of water from the ports to both shoulders of the user. The user may program the controller to control the motor to turn the first pipe or the second pipe to a third position which causes flow of water from the ports to left and right sides of the waist of the user. The user may program the controller to control the motor to turn the first pipe or the second pipe to a fourth position which causes flow of water from the ports to both shoulders and left and right sides of the waist of the user. The user may program the controller to control the motor to turn the first pipe or the second pipe to a fifth position which causes flow of water from the ports to left and right sides of the waist and both Achilles tendons of the user. The user may program the controller to control the motor to turn the first pipe or the second pipe to a sixth position with causes flow of water from the ports to left and right sides of the waist, both shoulders, and both Achilles tendons of the user. The user may program the controller to control the motor to turn the first pipe or the second pipe to a seventh position with causes flow of water from the ports to both shoulders and both Achilles tendons of the user. The user may program the controller to control the motor to turn the first pipe or the second pipe to an eighth position which causes flow of water from the ports to part of the waist, a shoulder, and an Achilles tendon of the user, which may be on a same side of the user or on alternating sides of the user or otherwise distributed about the user, with a ninth position to which the user may program the controller to control the motor to turn the first pipe or the second pipe causing flow of water in a complementary pattern, for instance, to another part of the waist, the other shoulder, and the other Achilles tendon of the user.

Programming of the controller may also allow the preselection of flow patterns among the positions of the first or the second pipe described above. For example a user might program the controller to alternate at specified intervals of time between the first and second positions described above causing water flow to alternate between a user's Achilles tendons and shoulders (e.g. ports 206, 212, 210, and 216). The controller might also be programmed to alternate at specified intervals of time between the first, second, and third positions causing water flow to a user's waist, Achilles tendons, and shoulders (e.g. ports 208, 214, 206, 212, 210, and 216). A user might also program the controller to alternate water flow between part of the waist, one Achilles tendon, and one shoulder (e.g. ports 214, 212, and 210). Through programming of the controller by a user, other patterns of preselection are possible by combining and isolating particular ports through the selection of various positions at specified intervals of time.

Referring to FIG. 3, the user at location 316 may program the controller to control the motor to turn the first pipe or the second pipe to a first position which causes flow of water from the ports to both shins and calves of the user. The user may program the controller to control the motor to turn the first pipe or the second pipe to a second position which causes flow of water from the ports to multiple sides of the lower back and abdomen of the user. The user may program the controller to control the motor to turn the first pipe or the second pipe to a third position which causes flow of water from the ports to the face, forehead, ears, hair, neck, and/or shoulders of the user, for instance, depending on tilting, stretching, bending and/or pivoting of the user's body. The user may program the controller to control the motor to turn the first pipe or the second pipe to a fourth position which causes flow of water from the ports to the shins, calves, face, forehead, ears, hair, neck, and shoulders of the user. The user may program the controller to control the motor to turn the first pipe or the second pipe to a fifth position which causes flow of water from the ports to multiple sides of the lower back, abdomen, face, forehead, ears, hair, neck, and shoulders of the user. The user may program the controller to control the motor to turn the first pipe or the second pipe to a sixth position with causes flow of water from the ports to the shins, calves, lower back, abdomen, face, forehead, ears, hair, neck, and shoulders of the user. The user may program the controller to control the motor to turn the first pipe or the second pipe to a seventh position with causes flow of water from the ports to multiple sides of the lower back and abdomen and both shins and calves of the user. The user may program the controller to control the motor to turn the first pipe or the second pipe to an eighth position which causes flow of water from the ports to a side of the lower back and abdomen, a side of the head, and a shin and calf of the user, which may be on a same side of the user or on alternating sides of the user or otherwise distributed about the user, with a ninth position to which the user may program the controller to control the motor to turn the first pipe or the second pipe causing flow of water in a complementary pattern, for instance, to another side of the lower back and abdomen, another side of the head, and the other shin and calf of the user.

Programming of the controller may also allow the preselection of flow patterns among the positions of the first or second pipe described. For example, the controller might be programmed to cause water flow to alternate at specified intervals of time between the first and second positions described above causing water flow to alternate between a user's shins and calves and multiple sides of the user's lower back and abdomen. The user might program the controller to alternate between the first, second, and third positions of the first or second pipe causing water flow to alternate between a user's shins and calves and multiple sides of the user's lower back and abdomen and face, forehead, ears, hair, neck, and/or shoulders. Alternatively, the controller might be programmed to cause water flow at specified intervals of time between one of a user's shins/calves, one side of the lower back/abdomen, and one side of the face and shoulder. Thus, a user might program the controller to preselect other flow patterns at preferred intervals of time by combining and isolating particular ports through the movement of the first and second pipes among a plurality of positions.

Turning to FIGS. 4–6 and 17–22, flow control device 102 may include outer pipe 402, inner pipe 404, motor 114, and controller 116. The outer pipe may rotatably receive the inner pipe. For example, the outer pipe may comprise a hollow cylindrical sleeve having an inner diameter sized to snugly and/or slidably engage a slightly smaller outer diameter of another hollow cylindrical sleeve comprising the inner pipe. The inner pipe may be connected with the motor. In addition, the inner pipe may include a plurality of inlets 406. The inner pipe may be configured for selective pivoting through movement by the motor to control alignment of the inlets with outlets 110 of the outer pipe: For example, the user, by programing the controller to control the motor to turn the outer pipe 402 or the inner pipe 404, may selectively align individual ones, sets, or subsets of the inlets with the outlets. Further, the movement of the outer pipe 402 or the inner pipe 404 by the motor may serve to selectively block individual ones, sets, or subsets of the outlets with one or more solid portions 425 of the inner pipe. Exemplary description of selective alignment of the inlets and solid portions with outlets by movement of the outer pipe 402 or the inner pipe 404, is presented herein.

Figure 4:
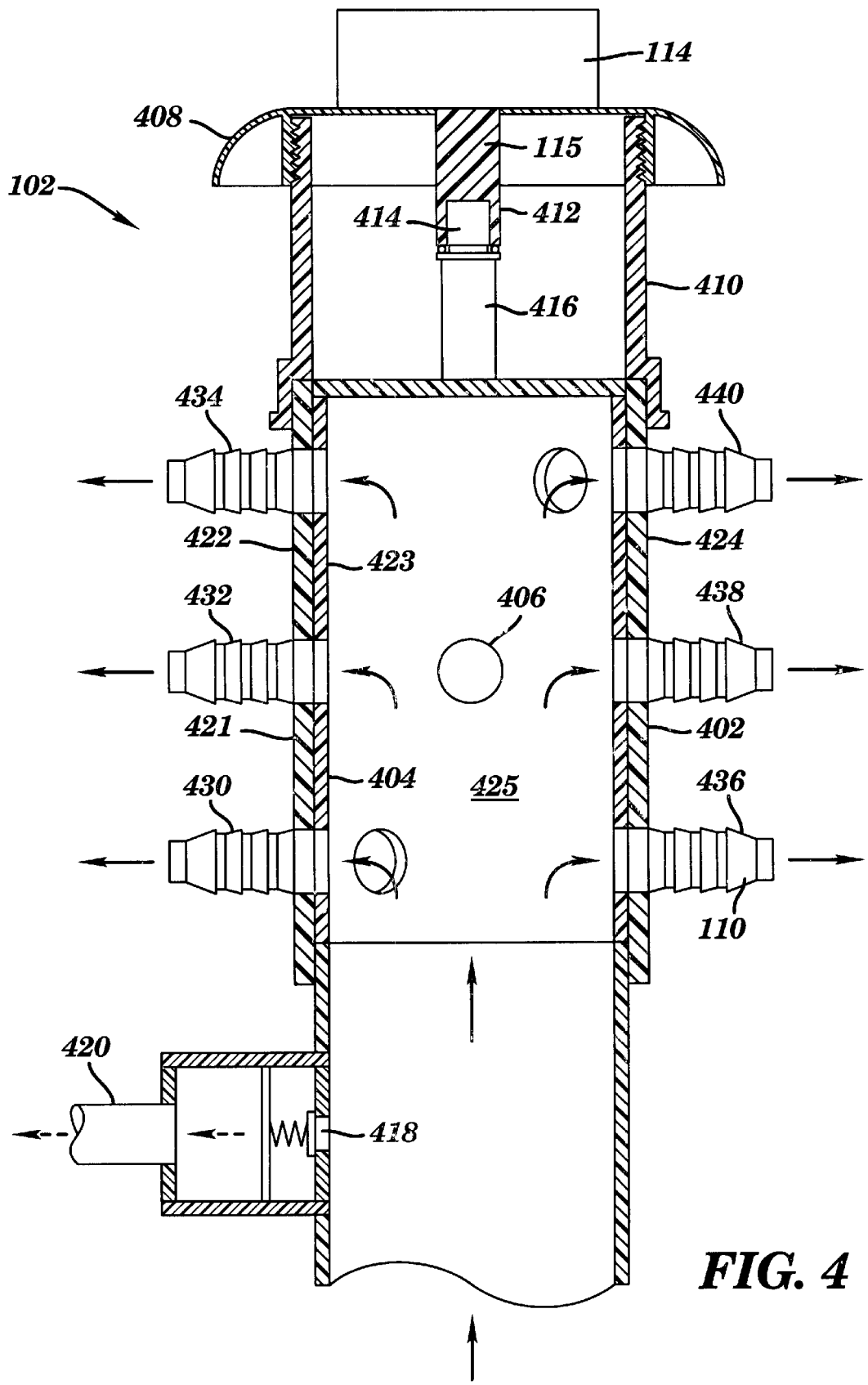
FIG. 4 is a cutaway, sectional, partial, elevation view of one example of a flow control device of a system as in FIGS. 1–3, illustrating one example of water flow through the device, further illustrating sets of outlets of an outer pipe of the flow control device generally directed in opposite directions, and also illustrating a relief valve of the flow control device.
Figure 5:
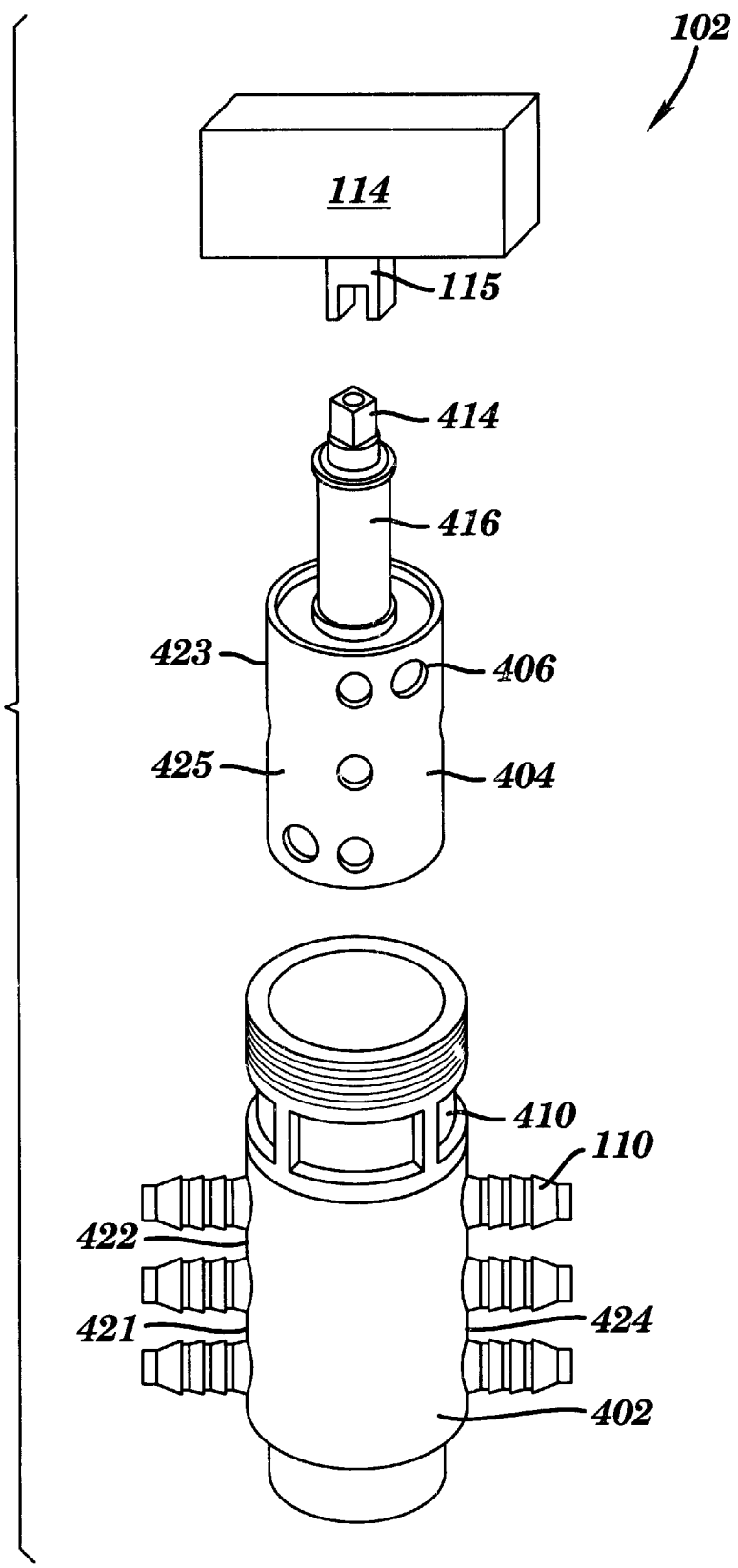
FIG. 5 is a partial, cutaway, exploded, perspective view of the flow control device of FIG. 4.

Referring to FIGS. 4–5, inlets 406 and outlets 110 may be sized for cooperative communication of water therethrough. In one example, the inlets and the outlets may be comparable in size. In another example, a number of the inlets may be sized slightly larger than the outlets, such as to provide a margin for error in alignment of the inlets with the outlets while providing complete water flow through a particular outlet. In a further example, the inlets and/or the outlets may comprise any number of shapes, locations, and/or patterns.

Referring to FIGS. 1–5, flow control device 102 may be located on surface 104 by attaching or fastening a portion of the flow control device to a wall of the tub, spa or shower. In one example, the wall may comprise the surface 104 of the tub, spa or shower. The wall may include a first side comprising a surface 104 facing in a direction toward interior 112, and a second side (e.g., the backside of the wall) facing in an opposite direction (e.g., away from the interior). For instance, bolts, nuts, screws, glue, gaskets and/or sealant may be employed to secure the flow control device to the tub, spa or shower. For example, the motor of the flow control device may be located on or beneath the surface 104 to allow pivoting of the outer pipe 402 or the inner pipe 404 by the motor through the programming of the controller by user 304 with the user located in the interior of the tub, spa or shower. Controller 116 or a display for controller 116, may be located on the surface 104.

Referring to FIGS. 4–5, neck 410 of flow control device 102 may be employed to support motor 114. The neck may extend through an aperture in a wall of the tub, spa or shower. The neck may be supported with outer pipe 402, for example, located behind the wall. In addition, the neck may be connected with cap 408 of the flow control device. For instance, the neck and the cap may be connected by mating screw threads. Further, the cap may include an opening through which may extend shaft 412 of the motor. The shaft 115 of the motor may receive head 414 of interconnector 416 of the flow control device. For example, the shaft 115 may include a recess or slot for receiving the head of the interconnector. The recess and the head may be sized and/or shaped cooperatively. For instance, the recess may include surfaces for static engagement with the head. to The interconnector may be supported and/or connected with inner pipe 404. Turning of the shaft by the motor controlled by the controller programmed by user 304 may advantageously transmit force applied by the shaft to the interconnector to effect pivoting of the inner pipe. For instance, the shaft may cause directly corresponding pivoting of the inner pipe. Referring to FIGS. 4–7 and 17–19, the shaft may be pivoted 360 degrees to effect selective full and/or partial alignments and/or non-alignments of inlets 406 of the inner pipe with outlets 110 of outer pipe. In another example, controller 116 or a display for controller 116 may have markings and/or indications for a number of occurrences of the full and/or partial alignments and/or non-alignments between the inlets and the outlets. Further illustrative description of turning of the shaft to effect pivoting of the inner pipe, is presented herein.

Referring to FIG. 4, flow control device 102 may include relief valve 418. The relief valve may be in communication with inner pipe 404. For example, the relief valve may provide relief of excess water pressure in the flow control device. For instance, the relief valve may be configured to provide pressure relief approximately at a particular level of fluid pressure. Referring to FIGS. 1–4, the relief valve may be in fluid communication with a port 108 located on surface 104 of the tub, spa or shower. A conduit 420 (FIG. 4) may provide communication between the relief valve and the port. In one example, water source 308 (FIG. 3) may comprise a pump providing a pressure head of approximately 26 p.s.i., and the relief valve may be triggered at approximately 14 p.s.i. For example, user 304 may program the controller 116 to select all outlets 110 for water flow to interior 112 of the tub, spa or shower, and then the user may program the controller 116 to select some of the outlets for water flow to the interior of the tub, spa or shower. The difference in water pressure resulting from transmission through all the outlets versus some of the outlets may be accommodated by the pressure relief valve. For instance, the excess water and/or energy of the pressure difference may be relieved and/or employed by transmission of the excess water through the relief valve to one or more ports 108 in the tub, spa or shower. Also, if more than one flow control device are connected together either in series or in parallel flow relationship, the use of a relief valve on each flow control device will ensure that no excess pressure is exerted within any of the flow control devices. Such excess pressure could conceivably occur when less than a certain number of flow control devices are in the "off" position.

Again referring to FIGS. 4–5, a number of portions of flow control device 102 may comprise a material such as plastic and/or ABS plastic. For instance, such a material may be formed by a technique such as molding and/or injection molding. In one example, a seal and/or fluid-tight seal may be provided between portions of flow control device 102. For instance, such a seal may comprise glue and/or gasketing material.

For illustrative purposes, detailed examples are presented herein.

Referring to FIGS. 4–6 and 17–22, flow control device 102 may include a number of sets of outlets 110 arranged in one or more circumferential portions 421 of outer pipe 402. The sets of outlets may be cooperatively and/or strategically arranged. For instance, a first set of the outlets may be located in a first circumferential portion 422 of the outer pipe, and a second set of outlets may be located in a second circumferential portion 424 of the outer pipe. In one example, referring to FIGS. 4–6, the first and second sets of outlets may be generally directed in opposite directions. In another example, referring to FIGS. 17–19, the first and second sets of outlets may be generally directed in orthogonal directions. In yet another example, referring to FIG. 20, a third set of outlets may be located in a third circumferential portion 920 of the outer pipe. For instance, still referring to FIG. 20, the sets of outlets of the outer pipe may be generally directed in directions having an obtuse angle (e.g., approximately 120 degrees) therebetween.

Referring to FIGS. 4–5, a first set of outlets 110 located in first circumferential portion 422 of outer pipe 402 may comprise three outlets, and a second set of the outlets located in second circumferential portion 424 of the outer pipe may comprise three outlets. The first set of outlets may comprise proximal outlet 430, medial outlet 432, and distal outlet 434. The second set of outlets may comprise proximal outlet 436, medial outlet 438, and distal outlet 440.

Referring to FIGS. 1–5, the first and second sets of outlets 110 may be in communication with first and second sets of ports 108 located in different parts of surface 104. The communication between the outlets and the ports may comprise a number of set-to-set (e.g., many-to-many), one-to-one, many-to-one, and/or one-to-many bases.

Referring to FIGS. 2 and 8–15, proximal outlet 430 may be in fluid communication with proximal port 206, medial outlet 432 may be in fluid communication with medial port 208, distal outlet 434 may be in fluid communication with distal port 210. For instance, the proximal port 206, the medial port 208, and the distal port 210 may comprise a first set of ports. The first set of ports may be located in first part 218 (FIG. 2) of the surface 104. So, the first set of outlets may be in fluid communication with the first set of ports on a one-to-one basis. In addition, proximal outlet 436 may be in fluid communication with proximal port 212, medial outlet 438 may be in fluid communication with medial port 214, and distal outlet 440 may be in fluid communication with distal port 216. So, the second set of outlets may be in fluid communication, on a one-to-one basis, with a second set of ports comprising the proximal port 212, the medial port 214, and the distal port 216. The second set of ports may be located in second part 220 (FIG. 2) of the surface 104. The first and second parts of the surface may be located about an intended location for user 304 (FIG. 3) in interior 112 of the tub, spa or shower. For example, the user may be intended to be located approximately at a location such as location 117 (FIG. 1) in the tub, location 222 (FIG. 2) in the spa, and/or location 316 (FIG. 3) in the shower.

Referring to FIGS. 1–7 and 17–22, inner pipe 404 may include a number of circumferential portions 423 comprising inlets 406 and solid portions 425 arranged for selectable and/or controllable water transmission from water source 308 to individual ones, subsets, and/or sets of outlets 110 and ports 108. Selective alignment of the circumferential portions of the inner pipe with the outlets, may be effected through the programming of the controller 116 by user 304 causing motor 114 to move the outer pipe 402 or the inner pipe 404.

In one example, referring to FIG. 7, inner pipe 404 may comprise a plurality of circumferential portions including inlets 406 and solid portions as follows. Circumferential portion 702 of the inner pipe may comprise proximal inlet 704, medial inlet 706, and distal inlet 708. Circumferential portion 710 of the inner pipe may comprise proximal solid portion 712, medial solid portion 714, and distal inlet 716. Circumferential portion 718 of the inner pipe may comprise proximal solid portion 720, medial inlet 722, and distal solid portion 724. Circumferential portion 726 of the inner pipe may comprise proximal inlet 728, medial solid portion 730, and distal solid portion 732. Circumferential portion 734 of the inner pipe may be analogous to the circumferential portion 702 of the inner pipe. Circumferential portion 736 of the inner pipe may be analogous to the circumferential portion 710 of the inner pipe. Circumferential portion 738 of the inner pipe may be analogous to the circumferential portion 718 of the inner pipe. Circumferential portion 740 of the inner pipe may be analogous to the circumferential portion 726 of the inner pipe.

Figure 8:
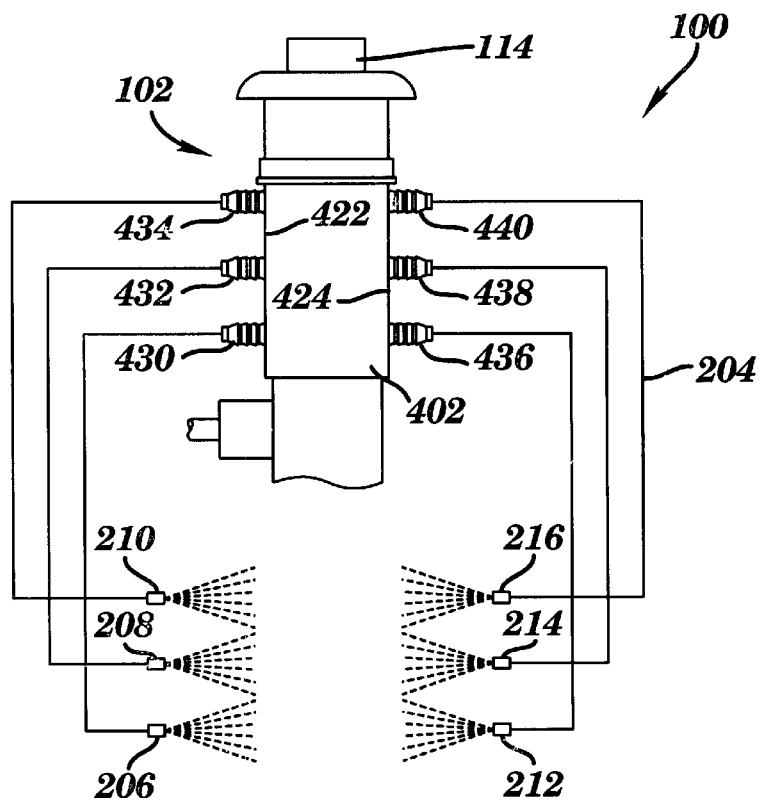
FIG. 8 is a partial, cutaway, schematic representation of one example of a system providing water flow from the flow control device of FIG. 7 to illustrative ports of the tub, spa or shower, representing two sets of three inlets of the inner pipe completely aligned with two sets of three outlets of the outer pipe.

Referring to FIGS. 7–8, a user may program the controller 116 to control the motor 114 to turn said outer pipe 402 or said inner pipe 404 to a first position in which circumferential portion 702 of inner pipe 404 may be aligned with circumferential portion 422 of outer pipe 402. So, inlets 704, 706, 708 may be aligned with outlets 430, 432, 434, respectively. Therefore, water may flow through the inner pipe to ports 206, 208, and 210. The first position may further align circumferential portion 734 of the inner pipe with circumferential portion 424 of the outer pipe. Thus, water may flow through the inner pipe to ports 212, 214, and 216.

Figure 9:
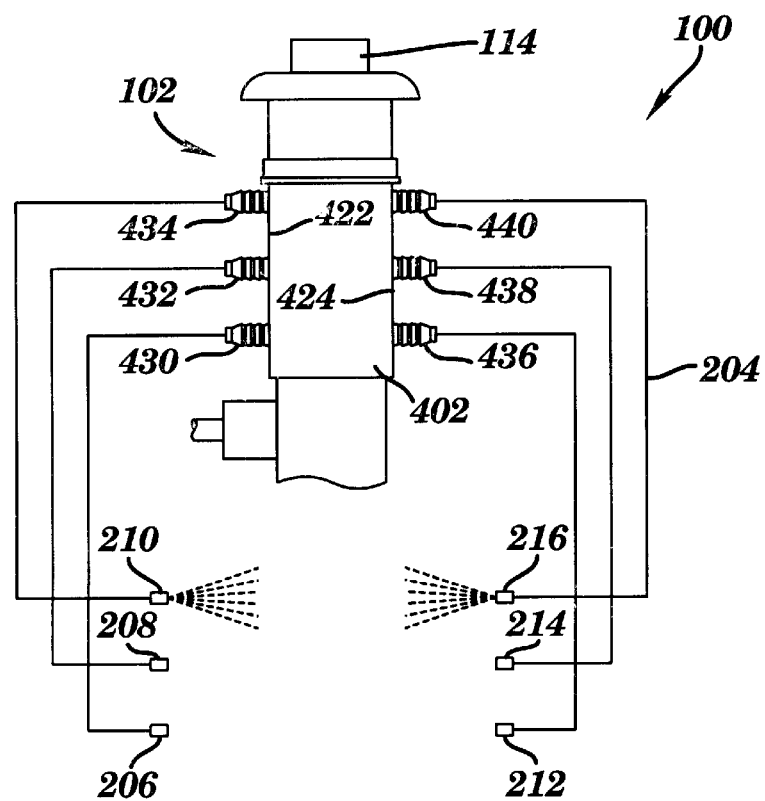
FIG. 9 is similar to FIG. 8, and represents two inlets of the inner pipe completely aligned with the distal outlets of the two sets of three outlets of the outer pipe.

Referring to FIGS. 7 and 9, a user may program the controller 116 to control the motor 114 to turn said outer pipe 402 or said inner pipe 404 to a second position in which circumferential portion 710 of inner pipe 404 may be aligned with circumferential portion 422 of outer pipe 402. So, inlet 716 may be aligned with outlet 434. In addition, solid portions 712 and 714 may be aligned with outlets 430 and 432, respectively. Therefore, water may flow through the inner pipe to port 210. Also, water may be blocked from flowing through the inner pipe to ports 206 and 208. The second position may further align circumferential portion 736 of the inner pipe with circumferential portion 424 of the outer pipe. Thus, water may flow through the inner pipe to port 216, and water may be blocked from flowing through the inner pipe to ports 212 and 214.

Figure 10:
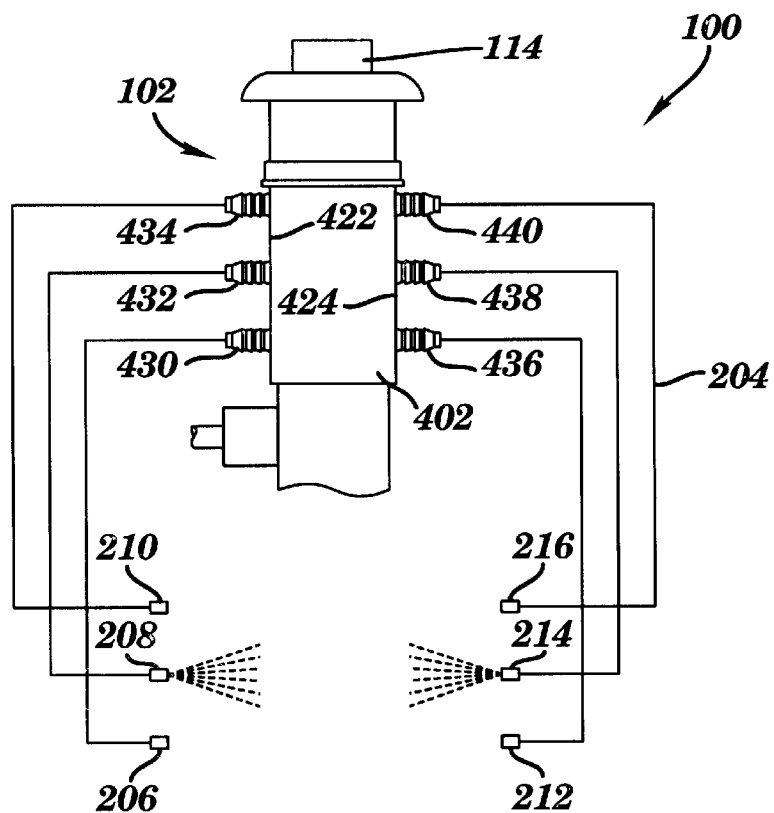
FIG. 10 is similar to FIG. 8, and represents two inlets of the inner pipe completely aligned with the medial outlets of the two sets of three outlets of the outer pipe.

Referring to FIGS. 7 and 10, a user may program the controller 116 to control the motor 114 to turn said outer pipe 402 or said inner pipe 404 to a third position in which circumferential portion 718 of inner pipe 404 may be aligned with circumferential portion 422 of outer pipe 402. So, inlet 722 may be aligned with outlet 432. In addition, solid portions 720 and 724 may be aligned with outlets 430 and 434, respectively. Therefore, water may flow through the inner pipe to port 208. Also, water may be blocked from flowing through the inner pipe to ports 206 and 210. The third position may further align circumferential portion 738 of the inner pipe with circumferential portion 424 of the outer pipe. Thus, water may flow through the inner pipe to port 214, and water may be blocked from flowing through the inner pipe to ports 212 and 216.

Figure 11:
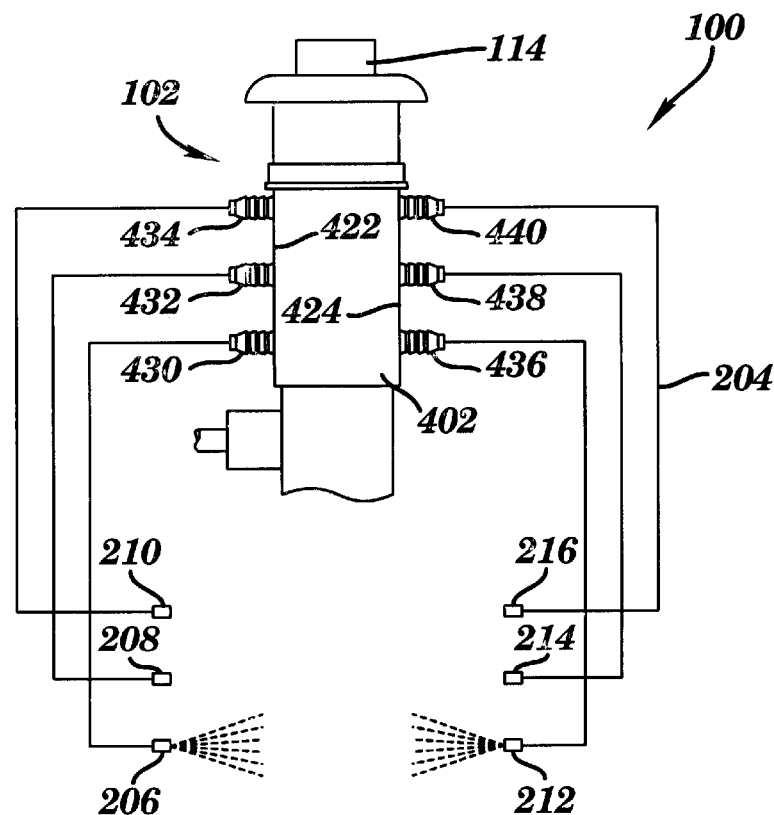
FIG. 11 is similar to FIG. 8, and represents two inlets of the inner pipe completely aligned with the proximal outlets of the two sets of three outlets of the outer pipe.

Referring to FIGS. 7 and 11, a user may program the controller 116 to control the motor 114 to turn said outer pipe 402 or said inner pipe 404 to a fourth position in which circumferential portion 726 of inner pipe 404 may be aligned with circumferential portion 422 of outer pipe 402. So, inlet 728 may be aligned with outlet 430. In addition, solid portions 730 and 732 may be aligned with outlets 432 and 434, respectively. Therefore, water may flow through the inner pipe to port 206. Also, water may be blocked from flowing through the inner pipe to ports 208 and 210. The fourth position may further align circumferential portion 740 of the inner pipe with circumferential portion 424 of the outer pipe. Thus, water may flow through the inner pipe to port 212, and water may be blocked from flowing through the inner pipe to ports 214 and 216.

Figure 12:
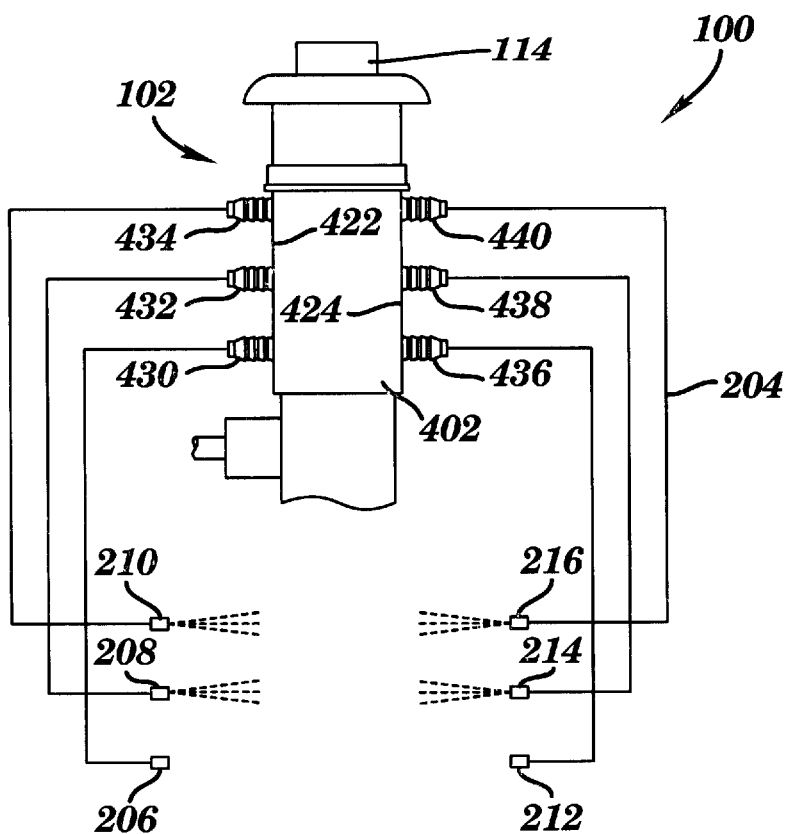
FIG. 12 is similar to FIG. 8, and represents four inlets of the inner pipe partially aligned with the medial and distal outlets of the two sets of the three outlets of the outer pipe.

Referring to FIGS. 7 and 12, a user may program the controller 116 to control the motor 114 to turn said outer pipe 402 or said inner pipe 404 to a position in which circumferential portions 710 and 718 of inner pipe 404 may be partially aligned with circumferential portion 422 of outer pipe 402. So, inlets 716 and 722 may be partially aligned with outlets 434 and 432, respectively. In addition, solid portions 712 and 720 may completely block outlet 430. Therefore, water may flow through the inner pipe to ports 208 and 210. This flow, resulting from a partial alignment of inlets with outlets, may be at a decreased rate of flow relative to the rate of flow provided by complete alignment of an inlet with an outlet. Also, the instant partial alignment of inlets in conjunction with the complete blockage by the solid portions, may cause water to be blocked from flowing through the inner pipe to port 206. The position may further partially align circumferential portions 736 and 738 of the inner pipe with circumferential portion 424 of the outer pipe. Thus, water may flow through the inner pipe to ports 214 and 216 (e.g., at a decreased rate of flow), and water may be blocked from flowing through the inner pipe to port 212.

Figure 13:
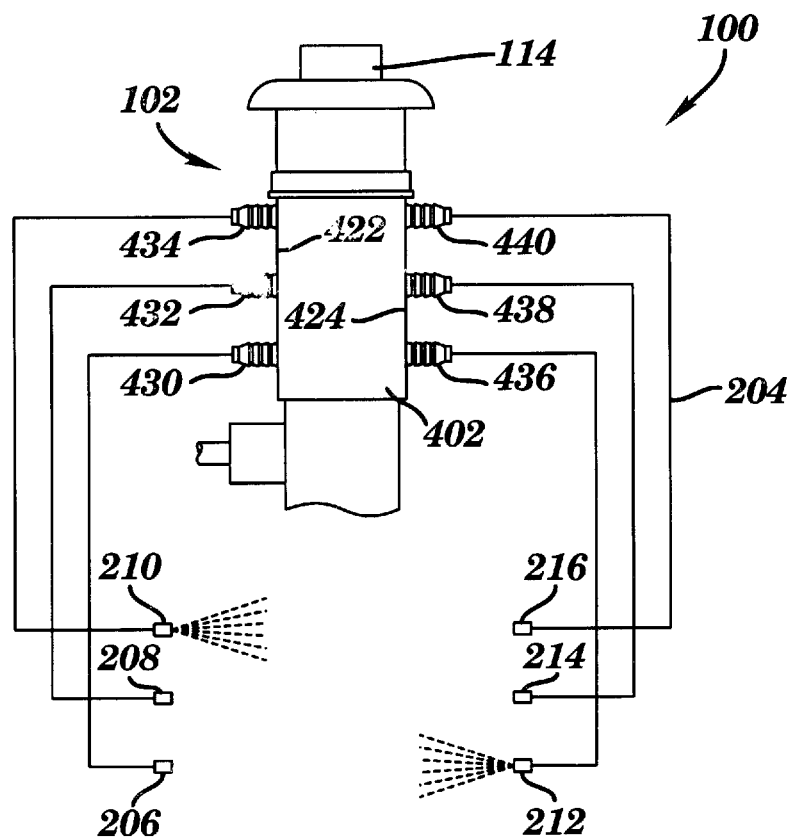
FIG. 13 is analogous to FIG. 8, and represents one inlet of the inner pipe completely aligned with the distal outlet of one of the two sets of three outlets of the outer pipe and another inlet of the inner pipe completely aligned with the proximal outlet of the other one of the two sets of the three outlets of the outer pipe.

Referring to FIGS. 4 and 13, a user may program the controller 116 to control the motor 114 to turn said outer pipe 402 or said inner pipe 404 to a position in which a first circumferential portion of inner pipe 404 may be aligned with circumferential portion 422 of outer pipe 402. The first circumferential portion of the inner pipe may comprise an inlet 406 of the inner pipe to be aligned with outlet 434 of the outer pipe. In addition, the first circumferential portion may comprise solid portions of the inner pipe to be aligned with outlets 430 and 432 of the outer pipe. So, water may flow through the inner pipe to port 210. Also, water may be blocked from flowing through the inner pipe to ports 206 and 208. The position may further align a second circumferential portion of the inner pipe with circumferential portion 424 of the outer pipe. The second circumferential portion of the inner pipe may comprise an inlet 406 of the inner pipe to be aligned with outlet 436 of the outer pipe. In addition, the second circumferential portion may comprise solid portions of the inner pipe to be aligned with outlets 438 and 440 of the outer pipe. Therefore, water may flow through the inner pipe to port 212, and water may be blocked from flowing through the inner pipe to ports 214 and 216. For instance, a staggered and/or asymmetric flow situation may thus be achieved.

Figure 14:
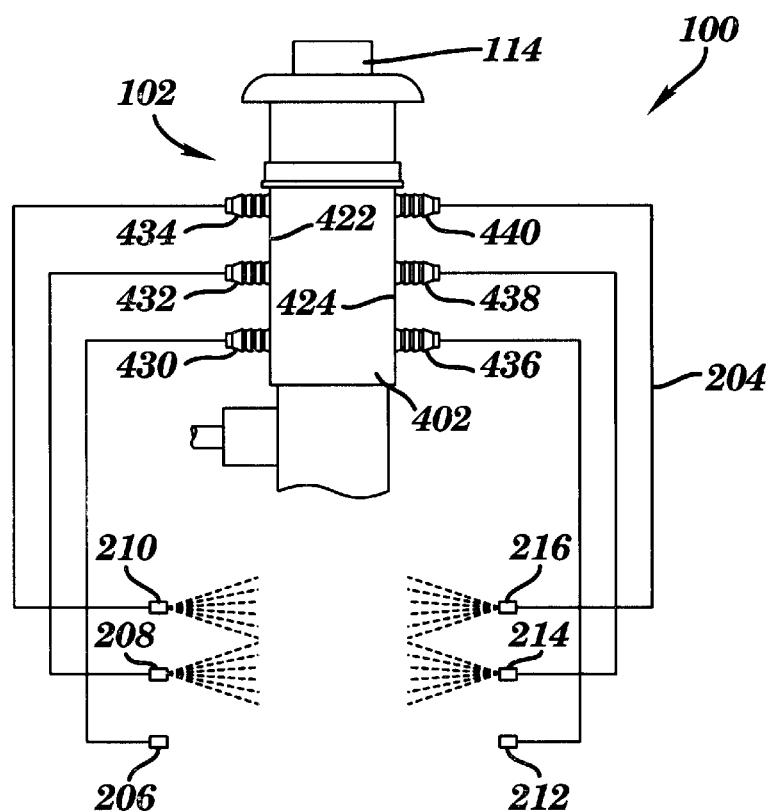
FIG. 14 is analogous to FIG. 8, and represents four inlets of the inner pipe completely aligned with the medial and distal outlets of the two sets of the three outlets of the outer pipe.

Referring to FIGS. 4 and 14, a user may program the controller 116 to control the motor 114 to turn said outer pipe 402 or said inner pipe 404 to a position in which a first circumferential portion of inner pipe 404 may be aligned with circumferential portion 422 of outer pipe 402. The first circumferential portion of the inner pipe may comprise inlets 406 of the inner pipe to be aligned with outlets 432 and 434 of the outer pipe. In addition, the first circumferential portion may comprise a solid portion of the inner pipe to be aligned with outlet 430 of the outer pipe. So, water may flow through the inner pipe to ports 208 and 210 Also, water may be blocked from flowing through the inner pipe to port 206. The position may further align a second circumferential portion of the inner pipe with circumferential portion 424 of the outer pipe. The second circumferential portion of the inner pipe may comprise inlets 406 of the inner pipe to be aligned with outlets 438 and 440 of the outer pipe. In addition, the second circumferential portion may comprise a solid portion of the inner pipe to be aligned with outlet 436 of the outer pipe. Therefore, water may flow through the inner pipe to ports 214 and 216, and water may be blocked from flowing through the inner pipe to port 212. For instance, a full rate of flow through two coordinated, adjacent pairs of ports comprising a subset of the ports may thus be achieved.

Figure 15:
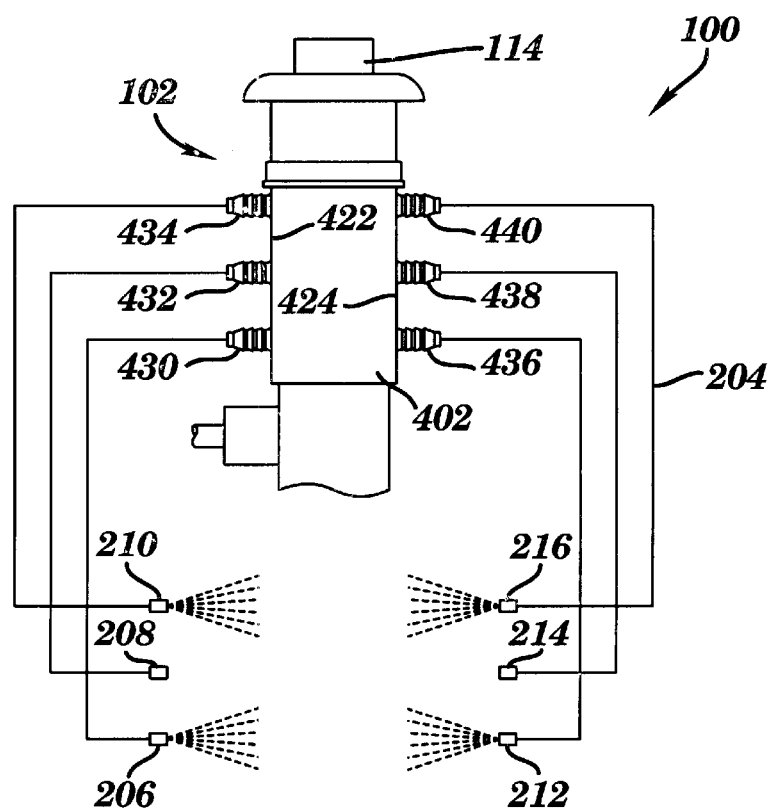
FIG. 15 is analogous to FIG. 8, and represents four inlets of the inner pipe completely aligned with the proximal and distal outlets of the two sets of the three outlets of the outer pipe.

Referring to FIGS. 4 and 15, a user may program the controller 116 to control the motor 114 to turn said outer pipe 402 or said inner pipe 404 to a position in which a first circumferential portion of inner pipe 404 may be aligned with circumferential portion 422 of outer pipe 402. The first circumferential portion of the inner pipe may comprise inlets 406 of the inner pipe to be aligned with outlets 430 and 434 of the outer pipe. In addition, the first circumferential portion may comprise a solid portion of the inner pipe to be aligned with outlet 432 of the outer pipe. So, water may flow through the inner pipe to ports 206 and 210 Also, water may be blocked from flowing through the inner pipe to port 208. The position may further align a second circumferential portion of the inner pipe with circumferential portion 424 of the outer pipe. The second circumferential portion of the inner pipe may comprise inlets 406 of the inner pipe to be aligned with outlets 436 and 440 of the outer pipe. In addition, the second circumferential portion may comprise a solid portion of the inner pipe to be aligned with outlet 438 of the outer pipe. Therefore, water may flow through the inner pipe to ports 212 and 216, and water may be blocked from flowing through the inner pipe to port 214. For instance, a full rate of flow through two coordinated, separated pairs of ports comprising a subset of the ports may thus be achieved.

Figure 18:
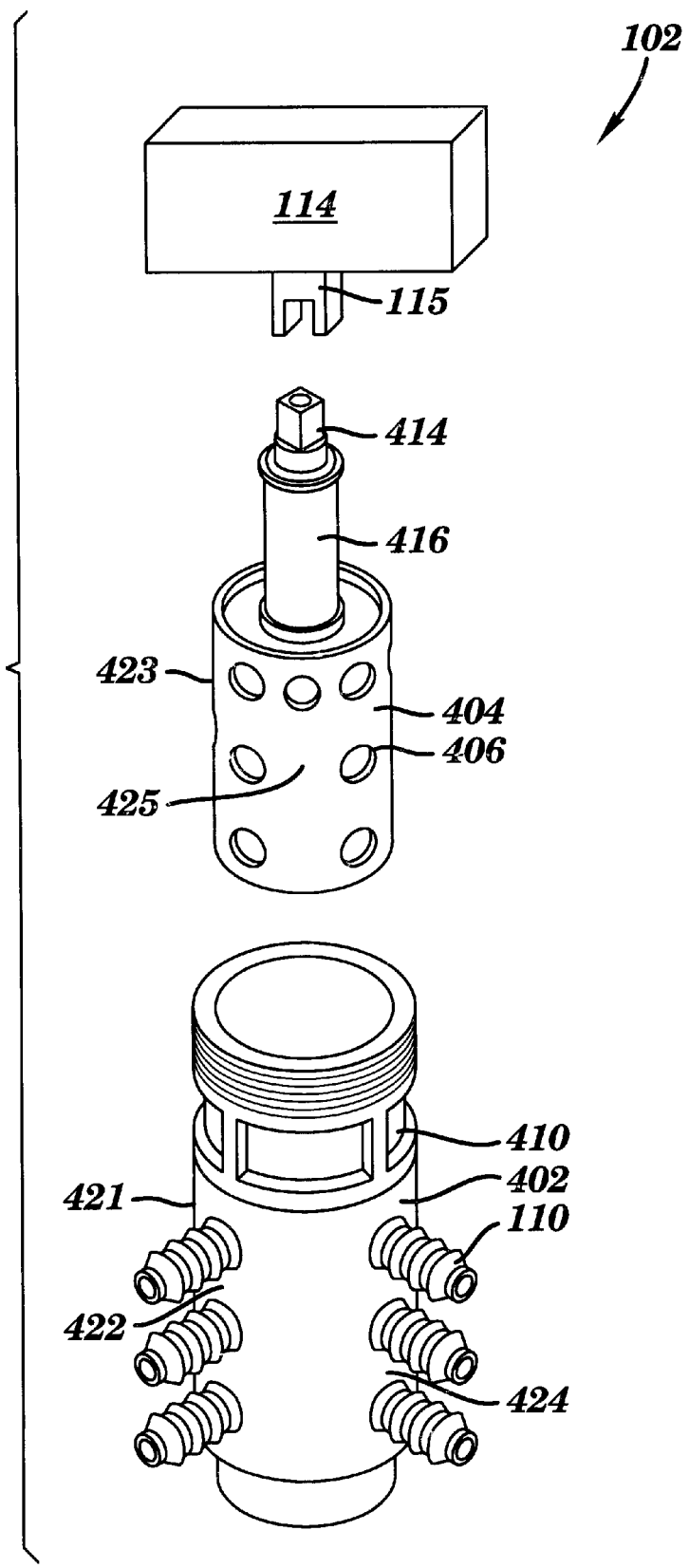
FIG. 18 is a partial, cutaway, exploded, perspective view of the flow control device of FIG. 17.
Figure 21:
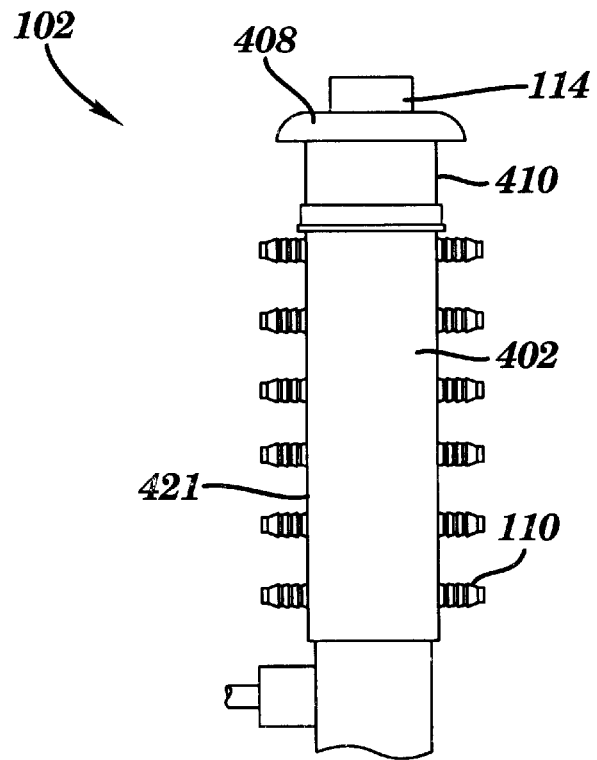
FIG. 21 is a partial, cutaway, side view of a further example of a flow control device.
Figure 22:
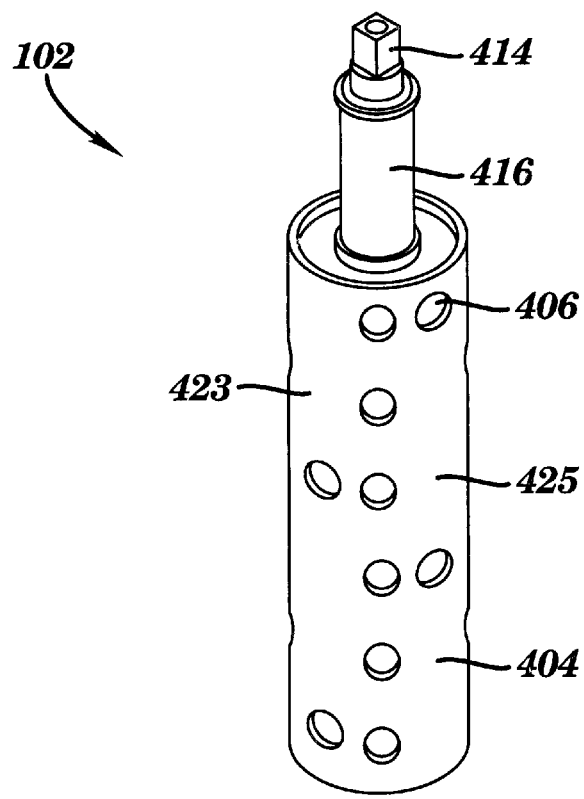
FIG. 22 is a partial, cutaway, perspective view of an inner pipe of the flow control device of FIG. 21.

Similar to the exemplary mapping represented in FIG. 7, additional illustrative mapping of inlets 406 of inner pipe 404 is represented in FIG. 19. For instance, the mapping of FIG. 19 may be employed in a flow control device 102 such as is depicted in FIGS. 1 and 17–18.

Referring to FIGS. 1–4 and the discussion above referencing FIGS. 7–15, positions as described above may be marked or indicated on controller 116 or a display for controller 116. The markings or indications may facilitate or ease programming of the controller by a user. In addition, the markings or indications may serve to assist selection by a user of ports 108 for flow of water to interior 112 of the tub, spa or shower.

In one example, referring to FIGS. 2 and 16, a connector 204 in fluid communication with a port 108 may be in fluid communication with air supply conduit 1602. For instance, the air supply conduit may be in fluid communication with the atmosphere. In one example, flow of pressurized water through the connector may serve to draw air from the air supply conduit for transmission of air with the water through the port to interior 112 of the tub, spa or shower. The port may resemble a venturi. For example, the port may have a throat which is constricted along the direction of flow, to cause an increase in velocity of the water flowing in the connector to effect a decrease in pressure that may draw air from the air supply conduit.

While parts of the description herein, for explanatory purposes, may imply certain exemplary directions, such directions may be considered relative. As will be appreciated by those skilled in the art, the significance of, for example, a "vertically upward" direction in many environments may stem from its opposition to a dominant "downwardly" acting gravitational force, resulting from the presence of a large mass such as the Earth, with "vertical" approximating radial alignment therewith. Furthermore, a "horizontal" direction and a "vertically upward" direction may be readily ascertained following determination of an appropriate "downward" direction. A number of design choices may allow accommodations of any orientations for any systems, ports, tubs, spas, showers, flow control devices, and/or portions thereof.

A force application and/or fluid flow may serve to cause advantageous effect(s). In one aspect, such force application and/or fluid flow may cooperate with other force application(s) and/or fluid flow(s) to achieve desired outcome(s). That is, a certain cause may be a contributor to desired result(s), occupying any of a number of positions within hierarchical arrangement(s) of causation(s) for outcome(s), benefit(s), advantage(s), and/or the like.

As will be appreciated by those skilled in the art, feature(s), characteristic(s), and/or advantage(s) of (e.g., portions of) the systems, ports, tubs, spas, showers, and/or flow control devices described herein, may be applied and/or extended to any embodiment (e.g., and/or portion thereof.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A system for control of water delivery to an interior of a tub, spa or shower, said system comprising:

a plurality of ports located on a surface of said tub, spa or shower, said plurality of ports configured to transmit water to said interior of said tub, spa or shower; and a flow control device in fluid communication with a water source, said device comprising:
      a motor;
      a first pipe including a plurality of inlets;
      said first pipe movable relative to a second pipe, said second pipe including a plurality of outlets in fluid communication with said plurality of ports; and
      a controller for controlling said motor, said controller being electrically coupled with said motor;
      said motor being operatively connected with said first pipe;
      wherein the moving of said first pipe by said motor controlled by said controller to a position of a plurality of positions serves to cause communication of an inlet of said plurality of inlets with a first outlet of said plurality of outlets, said first outlet adapted for fluid communication with a first port of said plurality of ports, the communication of said inlet with said first outlet serving to allow flow of water from said water source, when in fluid communication with said flow control device, to said inlet to said first outlet to said first port to said interior of said tub, spa or shower, the moving of said first pipe to said position also serving to block a second outlet of said plurality of outlets with a solid portion of said first pipe, said second outlet adapted for fluid communication with a second port of said plurality of ports, the blocking of said second outlet with said solid portion serving to prevent flow of water from said water source, when in fluid communication with said flow control device, to said second port to said interior of said tub, spa or shower and;

wherein said device comprises a relief valve configured to provide pressure relief approximately at a particular level of fluid pressure in said device, said relief valve adapted for fluid communication with an additional port adapted to be located on said surface of said tub, spa or shower.

2. The system of claim 1 wherein said controller is programmable to allow water from said water source to flow to one or more of said ports in a preselected flow pattern.

3. The system of claim 1, wherein said controller is programmable by a user to control the motor to move the first pipe among a plurality of positions.

4. The system of claim 3, wherein programming of the controller by a user serves to cause the controller to control the motor to move the first pipe among a plurality of positions at programmed intervals of time.

5. The system of claim 1, wherein said position comprises a first position of said plurality of positions, wherein said inlet comprises a first inlet of said plurality of inlets, and wherein the moving of said first pipe to a second position of said plurality of positions serves to cause communication of a second inlet of said plurality of inlets with said second outlet, the communication of said second inlet with said second outlet serving to allow flow of water from said water source, when in fluid communication with said flow control device, to said second inlet to said second outlet to said second port to said interior of said tub, spa or shower.

6. The system of claim 5, wherein the moving of said first pipe to said second position further serves to cause fluid communication of a third inlet of said plurality of inlets with said first outlet, the fluid communication of said third inlet with said first outlet serving to allow flow of water from said water source, when in fluid communication with said flow control device, to said third inlet to said first outlet to said first port to said interior of said tub, spa or shower.

7. The system of claim 5, wherein the moving of said first pipe to said second position further serves to block said first outlet with a second solid portion of said first pipe, the blocking of said first outlet with said second solid portion serving to prevent flow of water from said water source, when in fluid communication with said flow control device, to said first port to said interior of said tub, spa or shower.

8. The system of claim 5, wherein said first pipe comprises a plurality of circumferential portions, said first inlet and said solid portion located in a first circumferential portion of said plurality of circumferential portions, said second inlet located in a second circumferential portion of said plurality of circumferential portions, said second circumferential portion being different from said first circumferential portion.

9. The system of claim 5, wherein said first pipe comprises a plurality of circumferential portions, said first inlet located in a first circumferential portion of said plurality of circumferential portions, said second inlet located in a second circumferential portion of said plurality of circumferential portions, said solid portion located in a third circumferential portion of said plurality of circumferential portions, said third circumferential portion located between said first and second circumferential portions.

10. The system of claim 1 wherein moving said first pipe to a second position further serves to cause a partial communication of said first inlet with said first outlet, the partial communication of said first inlet with said first outlet serving to allow flow of water from said water source, when in fluid communication with said flow control device, to said first inlet to said first outlet to said first port to said interior of said tub, spa or shower.

11. The system of claim 10, wherein the partial communication of said first inlet with said first outlet serves to allow a decreased rate of flow of water from said water source to said first inlet to said first outlet to said first port to said interior of said tub, spa or shower.

12. The system of claim 1, wherein the moving of said first pipe by said motor controlled by said controller to said position further serves to cause fluid communication of a second inlet of said plurality of inlets with a third outlet of said plurality of outlets, said third outlet in fluid communication with a third port of said plurality of ports, the communication of said second inlet with said third outlet serving to allow flow of water from said water source, when in fluid communication with said flow control device, to said second inlet to said third outlet to said third port to said interior of said tub, spa or shower.

13. The system of claim 12, wherein the moving of said first pipe to said position further serves to block a fourth outlet to said plurality of outlets with a second solid portion of said first pipe, said fourth outlet in fluid communication with a fourth port of said plurality of ports, the blocking of said fourth outlet with said second solid portion serving to prevent flow of water from said water source, when in fluid communication with said flow control device, to said fourth port to said interior of said tub, spa or shower.

14. The system of claim 13, wherein said position comprises a first position of said plurality of positions, wherein said inlet comprises a first inlet of said plurality of inlets, and wherein the moving of said first pipe by said motor controlled by said controller to a second position of said plurality of positions serves to cause fluid communication of a third inlet of said plurality of inlets with said second outlet and cause fluid communication of a fourth inlet of said plurality of inlets with said fourth outlet, the communication of said third inlet with said second outlet serving to allow flow of water from said water source, when in fluid communication with said flow control device, to said third inlet to said second outlet to said second port to said interior of said tub, spa or shower, the communication of said fourth inlet with said fourth outlet serving to allow flow of water from said water source, when in fluid communication with said flow control device, to said fourth inlet to said fourth outlet to said fourth port to said interior of said tub, spa or shower.

15. The system of claim 12, wherein said first port and said third port are located on different parts of said surface about an intended location for a user in said tub, spa or shower.

16. The system of claim 1, further comprising an air supply conduit in fluid communication with said first port, the flow of water through said inlet to said first port to said interior of said tub, spa or shower serving to draw air from said air supply conduit for transmission, with the flow of water, through said first port to said interior of said tub, spa or shower.

17. The system of claim 1, further comprising:
a second plurality of ports located on said surface of said tub, spa or shower, said second plurality of ports configured to transmit water to said interior of said tub, spa or shower; and
a second flow control device in communication with said water source, said second device comprising:
a second motor electrically coupled to said controller;
a third pipe including a second plurality of inlets; and
said third pipe movable relative to a fourth pipe, said fourth pipe including a second plurality of outlets in fluid communication with said second plurality of ports;
said second motor being operatively connected with said third pipe or said fourth pipe;
wherein the moving of said third pipe by said second motor controlled by said controller to a second position of a second plurality of positions serves to cause communication of a second inlet of said second plurality of inlets with a third outlet of said second plurality of outlets, said third outlet adapted for fluid communication with a third port of said second plurality of ports, the communication of said second inlet with said third outlet serving to allow flow of water from said water source, when in fluid communication with said flow control device, to said second inlet to said third outlet to said third port to said interior of said tub, spa or shower, the moving of said third pipe or said fourth pipe to said second position also serving to block a fourth outlet of said second plurality of outlets with a second solid portion of said third pipe, said fourth outlet in fluid communication with a fourth port of said second plurality of ports, the blocking of said fourth outlet with said second solid portion serving to prevent flow of water from said water source, when in fluid communication with said flow control device, to said fourth port to said interior of said tub, spa or shower.

18. The system of claim 17 wherein said controller is programmable to allow water from said water source to flow to one or more of said ports in a preselected flow pattern.

19. The system of claim 17, said controller is programmable by a user to control the second motor to move said third pipe or said fourth pipe among a plurality of positions.

20. The system of claim 19, wherein the programming of the controller by a user serves to cause the controller to control the motor to move the third pipe or the fourth pipe among a plurality of positions at programmed intervals of time.

* * * * *